United States Patent
Togita

(10) Patent No.: US 8,385,727 B2
(45) Date of Patent: Feb. 26, 2013

(54) RECORDING APPARATUS, RECORDING METHOD, PROGRAM AND STORAGE MEDIUM

(75) Inventor: Koji Togita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 852 days.

(21) Appl. No.: 12/515,868

(22) PCT Filed: Jan. 15, 2008

(86) PCT No.: PCT/JP2008/050664
§ 371 (c)(1),
(2), (4) Date: May 21, 2009

(87) PCT Pub. No.: WO2008/088061
PCT Pub. Date: Jul. 24, 2008

(65) Prior Publication Data
US 2010/0067879 A1 Mar. 18, 2010

(30) Foreign Application Priority Data
Jan. 18, 2007 (JP) .................................. 2007-009585

(51) Int. Cl.
*H04N 5/92* (2006.01)
(52) U.S. Cl. ........................................................ 386/337
(58) Field of Classification Search .......... 386/230–232, 386/337
See application file for complete search history.

(56) References Cited

U.S. PATENT DOCUMENTS

| 6,157,674 A * | 12/2000 | Oda et al. ....................... 375/240 |
| 7,054,546 B2 * | 5/2006 | Murakami et al. ............. 386/248 |
| 2003/0021298 A1 | 1/2003 | Murakami et al. |
| 2006/0050778 A1 | 3/2006 | Aridome et al. ......... 375/240.01 |
| 2006/0051066 A1 | 3/2006 | Aridome et al. .............. 386/111 |
| 2006/0171446 A1 | 8/2006 | Tanaka |

FOREIGN PATENT DOCUMENTS

| JP | 2003-46949 | 2/2003 |
| JP | 2005-136633 | 5/2005 |
| JP | 2005-136634 | 5/2005 |
| JP | 2006-217280 | 8/2006 |
| WO | 96/17492 A2 | 6/1996 |

OTHER PUBLICATIONS

Jul. 26, 2011 Extended European Search Report in European Patent Appln. No. 08703514.3.

* cited by examiner

*Primary Examiner* — Thai Tran
*Assistant Examiner* — William Tran
(74) *Attorney, Agent, or Firm* — Fitzpatrick, Cella, Harper & Scinto

(57) ABSTRACT

In a recording apparatus, a succeeding chapter of a video stream is recorded by being connected to the preceding chapter of the video stream contained in a multiplexed stream. When transfer of the succeeding chapter of the video signal from a video encoder to a VBV buffer starts, a multiplexer is controlled in such a manner that the fullness of the VBV buffer will exceed a set threshold value.

4 Claims, 11 Drawing Sheets

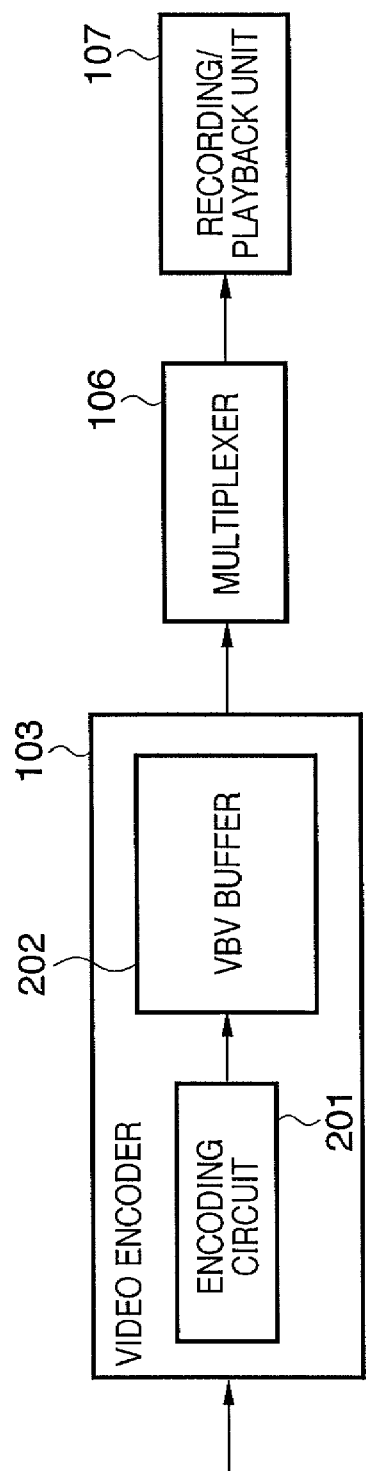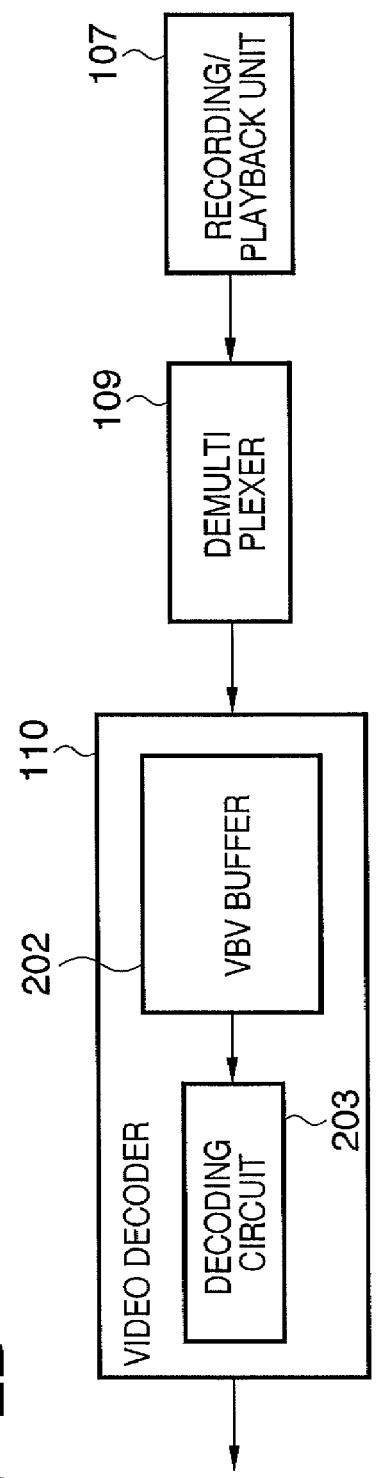

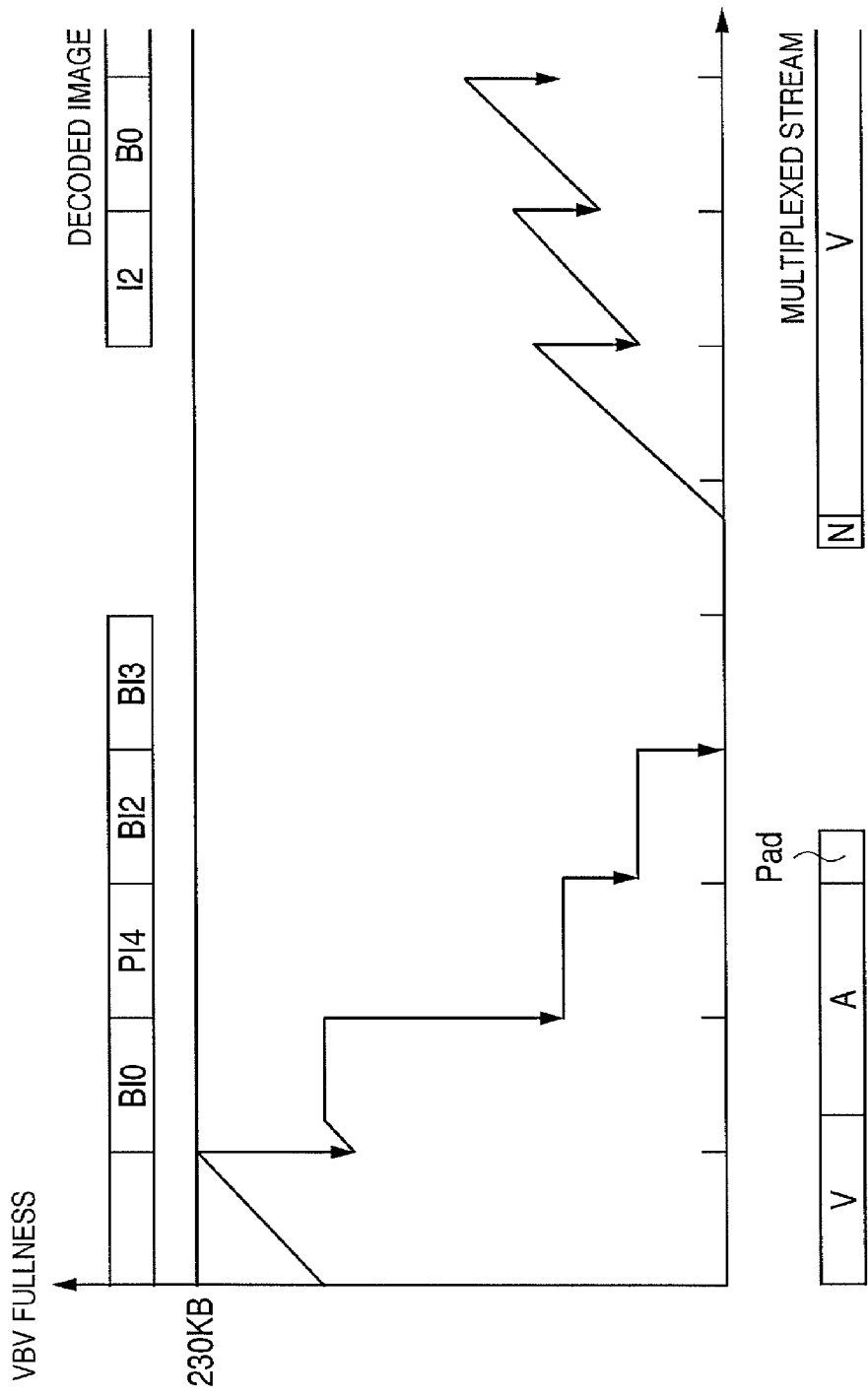
F I G. 4

F I G. 10

| VIDEO OF PRECEDING CHAPTER | VIDEO OF SUCCEEDING CHAPTER |
|---|---|
| AUDIO OF PRECEDING CHAPTER | AUDIO OF SUCCEEDING CHAPTER |

RECORDING APPARATUS, RECORDING METHOD, PROGRAM AND STORAGE MEDIUM

TECHNICAL FIELD

The present invention relates to a recording apparatus, recording method, program and storage medium for recording video information, such as a still image or moving picture, and audio information on a recording medium.

BACKGROUND ART

Video cameras that employ a disk-shaped recording medium as a storage medium have started to become commercially available in recent years. Such video cameras are compact and highly portable and it is believed that they will become increasingly popular forwarding the future. In such a device, a multiplexed stream is recorded on the recording medium at the time of recording. The multiplexed stream is the result of multiplexing a video stream, which has been compressed and encoded as by the MPEG scheme, and an audio stream.

The DVD-Video standard is known as a standard for thus recording video data and audio data on a recording medium. With the DVD-Video standard, moving picture data is recorded upon being encoded by the MPEG-2 scheme. According to the MPEG-2 standard, a buffer memory referred to as a VBV (Video Buffering Verifier) buffer for accumulating encoded data is hypothesized between an encoder and a decoder in a signal processing circuit, and encoding is performed in such a manner that the VBV buffer will not fail.

However, in a case where pictures shot by a video camera are recorded, recording is performed by so-called stop-and-go connective shooting. That is, intermittent recording that involves recording, temporary stop, recording, temporary stop, recording and so on, can be performed frequently. Imagine a case where video streams of a plurality of scenes encoded and recorded intermittently are connected and recorded in such a manner that there will be no loss of presentation at the time of playback. In this case, there is the danger that the VBV buffer will fail because the data of succeeding scene is input to the VBV buffer without taking into consideration the amount of the VBV buffer occupied by a preceding scene.

An example of a VBV buffer in the failed condition is underflow, namely when data that is to be decoded has not accumulated in memory at such time that the data is to be decoded.

Accordingly, as disclosed in the specification of Japanese Patent Laid-Open No. 2005-136633, there has been proposed a technique in which the amount of code of the lead-off picture in a succeeding chapter of a succeeding video stream is adjusted at the time of recording in order to perform recording connectively without VBV buffer failure and in such a manner that playback can be performed without loss of data between items of video data of a plurality of scenes.

With the prior-art arrangement disclosed in the specification of Japanese Patent Laid-Open No. 2005-136633, recording without loss of data at the time of playback is possible by controlling the fullness of the VBV buffer at the time of recording. However, the amount of code that can be allocated to the lead-off picture of a succeeding video stream depends upon the amount of the VBV buffer occupied by a preceding video stream at the time that playback of the succeeding video stream starts. Consequently, if a situation arises in which a sufficient amount of code cannot be allocated to the lead-off picture of the succeeding video stream at the time of playback, the image quality of playback video may be degraded by loss of data during the course of changeover from the preceding stream to the succeeding stream, and there is the possibility that the user will find this annoying.

DISCLOSURE OF INVENTION

Accordingly, an object of the present invention is to provide a recording apparatus that is capable of successively recording a plurality of different video streams without degrading the quality of a succeeding video stream at playback.

According to the present invention, the foregoing object is attained by providing a recording apparatus comprising: a video encoder for encoding video data and generating a video stream; an audio encoder for encoding audio data and generating an audio stream; a multiplexer for multiplexing the video stream and audio stream and generating a multiplexed stream; a recording unit for recording the multiplexed stream on a recording medium; a fullness controller for controlling the video encoder based upon amount of a virtual buffer memory occupied by the multiplexed stream, the virtual memory being used when the multiplexed stream is decoded; and a multiplexing controller for controlling multiplexing of the audio stream by the multiplexer onto a first multiplexed stream in such a manner that the fullness of the virtual buffer memory at the time of decoding of a lead-off picture of the video stream contained in a second multiplexed stream of the multiplexed stream, which is played back following the first multiplexed stream of the multiplexed stream, will exceed a set threshold value.

According to the present invention, the foregoing object is attained by providing a recording method comprising: a video encoding step of encoding video data and generating a video stream; an audio encoding step of encoding audio data and generating an audio stream; a multiplexing step of multiplexing the video stream and audio stream and generating a multiplexed stream; a recording step of recording the multiplexed stream on a recording medium; a fullness control step of controlling the video encoder based upon the amount of a virtual buffer memory occupied by the multiplexed stream, the virtual memory being used when the multiplexed stream is decoded; and a multiplexing control step of controlling multiplexing of the audio stream by the multiplexing step onto a first multiplexed stream in such a manner that the fullness of the virtual buffer memory at the time of decoding of a lead-off picture of the video stream contained in a second multiplexed stream of the multiplexed stream, which is played back following the first multiplexed stream of the multiplexed stream, will exceed a set threshold value.

In accordance with the recording apparatus of the present invention, it is possible to successively record different chapters of a video stream without degrading the image quality of a succeeding chapter at playback.

Further features of the present invention will become apparent from the following description of exemplary embodiments (with reference to the attached drawings).

BRIEF DESCRIPTION OF DRAWINGS

FIG. 2A is a diagram showing the specific structure of part of the recording apparatus according to this embodiment of the present invention;

FIG. 2B is a diagram showing the specific structure of part of the recording apparatus according to this embodiment of the present invention;

FIG. 4 is a conceptual view illustrating the transition of VBV buffer fullness at the time of connection with loss of data in MPEG-2;

FIG. 10 is a conceptual view illustrating the relationship between audio and video of preceding and succeeding chapters at the time of connection without loss of data in a recording apparatus according to this embodiment of the present invention.

BEST MODE FOR CARRYING OUT THE INVENTION

Figure 1A:
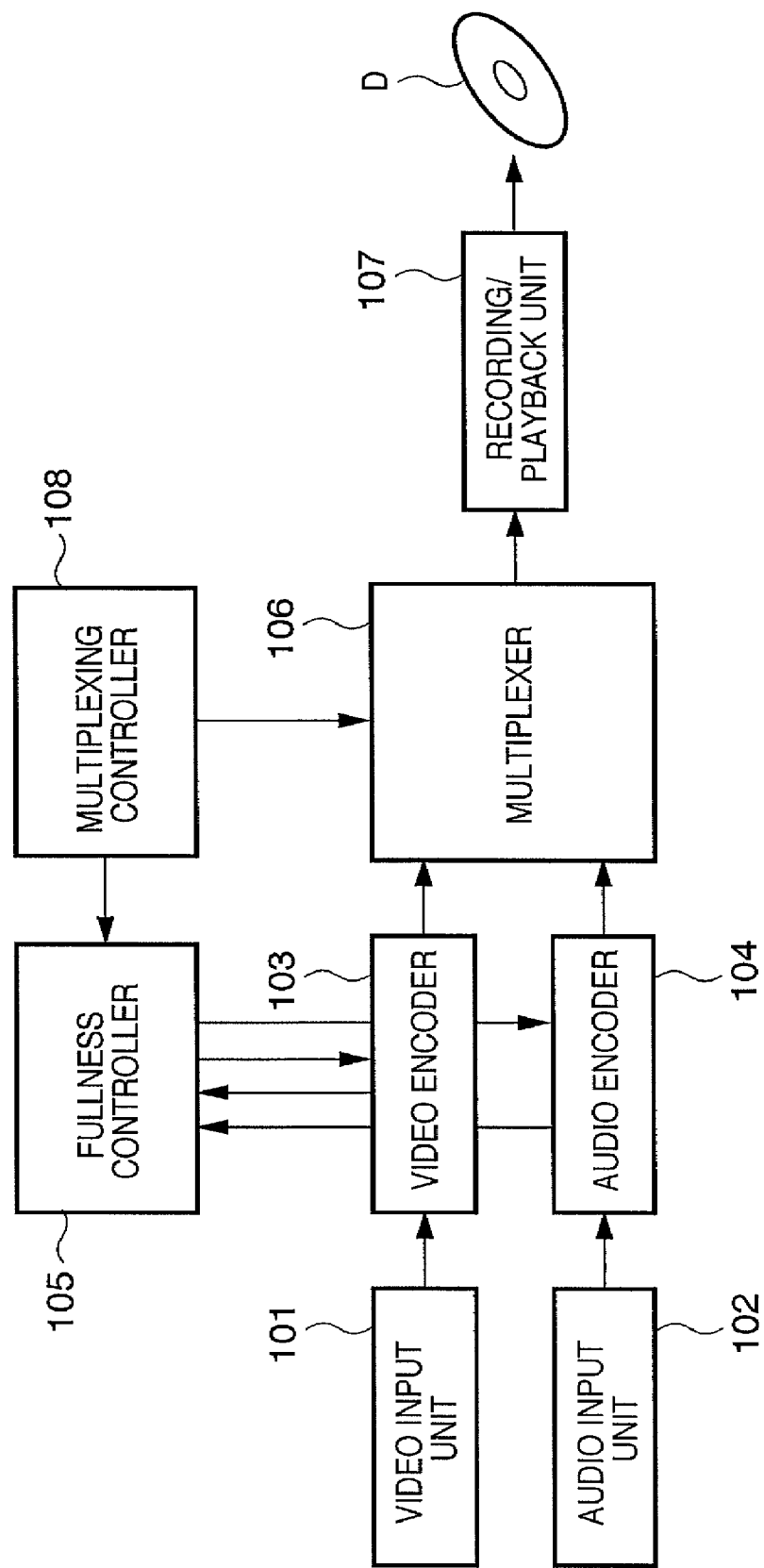
FIG. 1A is a block diagram of a recording apparatus according to an embodiment of the present invention.
Figure 1B:
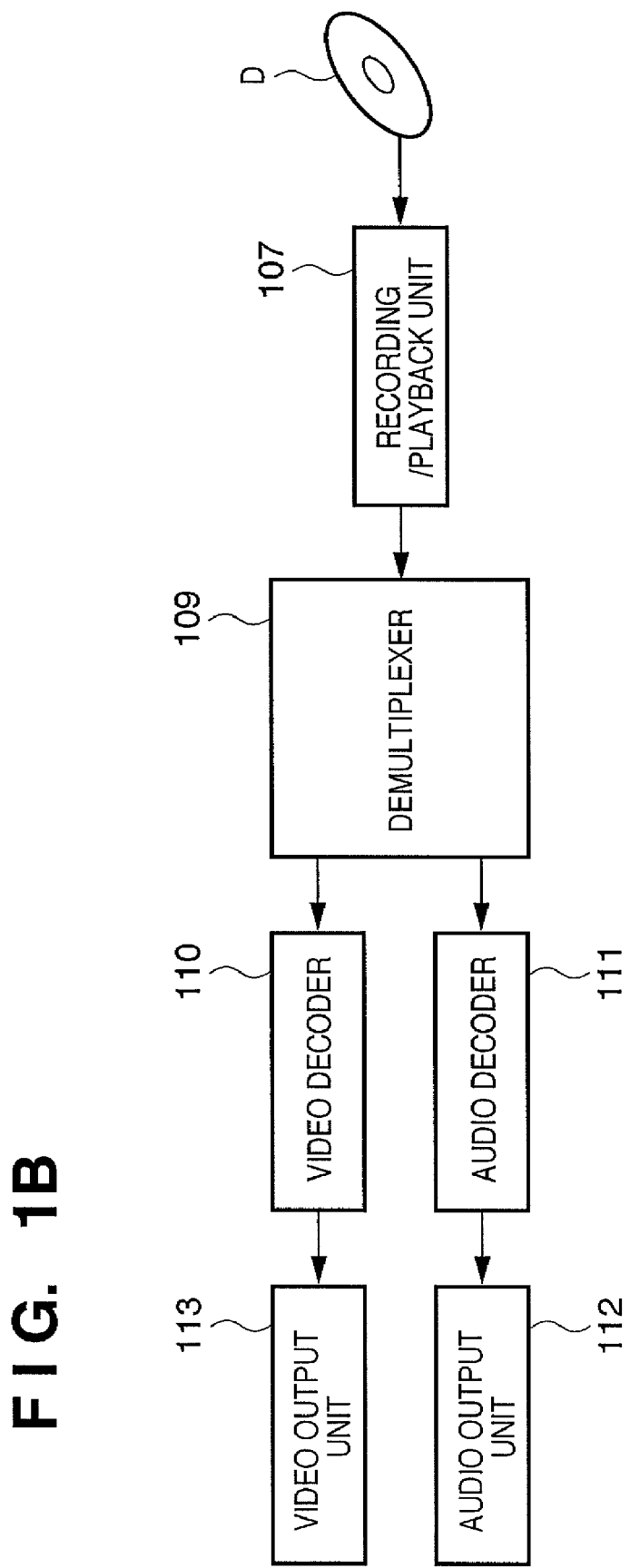
FIG. 1B is a block diagram of a recording apparatus according to an embodiment of the present invention.

FIG. 1A is a conceptual block diagram of a recording apparatus according to a first embodiment of the present invention, and FIG. 1B is a conceptual block diagram of a playback apparatus for playing back a recording medium D that has been recorded on by the recording apparatus of FIG. 1A. Reference will be had to FIGS. 1A and 1B to describe an arrangement in which a video stream is recorded in such a manner that loss of data will not occur between scenes when video streams of a plurality of scenes are played back successively in the recording apparatus according to this embodiment of the present invention.

The recording side and the playback side are usually constructed as a single recording/playback apparatus. Here, however, these are illustrated as being different for the sake of explanation. Accordingly, in the description that follows, FIG. 1A will be described as the recording side and FIG. 1B as the playback side. Since the arrangement is that of a single recording/playback apparatus in which the recording and playback sides have been incorporated, the circuits on the recording and playback sides are partially shared and some of the reference characters are shared as well in the description.

On the recording side in FIG. 1A, a video input unit 101 supplies input video data to a video encoder 103. An audio input unit 102 supplies input audio data to an audio encoder 104. The video encoder 103 encodes the input video data by a well-known compressive encoding method such as the MPEG scheme and outputs the encoded data to a multiplexer 106 as a video stream. The audio encoder 104 encodes the input audio data by a well-known compressing encoding method such as AC3 and outputs the encoded data to the multiplexer 106 as an audio stream.

The multiplexer 106 multiplexes the video stream that has been output from the video encoder 103 and the audio stream that has been output from the audio encoder 104 into the DVD format conforming to the recording medium D and supplies the result to a recording/playback unit 107 as a multiplexed stream. The recording/playback unit 107 writes the multiplexed stream from the multiplexer 106 to the recording medium D. In this case, it is assumed that the recording/playback unit 107 is constituted by a recording unit and a playback unit. Although an optical pick-up usually is used for recording and playback of a disk-shaped recording medium, the same optical pick-up is used at the time of recording and at the time of playback. The recording unit is connected to the optical pick-up at the time of recording, and the playback unit is connected at the time of playback.

In the recording apparatus according to this embodiment, a multiplexed stream of a series of scenes recorded on the recording medium (disk) D between a recording-start command and a recording-stop command from the user is managed as one chapter in the DVD video standard.

In this series of recording process steps, a fullness controller 105 monitors the fullness of a VBV buffer in accordance with the MPEG-2 standard and controls the video encoder 103 in such a manner that the VBV buffer will not underflow. Further, a multiplexing controller 108 controls the fullness controller 105 and multiplexer 106. The details will be described later. It should be noted that fullness of the VBV buffer means the amount of code present within the VBV buffer. Furthermore, the VBV buffer is a virtual buffer memory and is provided conceptually in association with the video encoder 103 and multiplexer 106. In actuality, therefore, the VBV buffer is not necessarily provided in association with the video encoder 103 and multiplexer 106 and does not necessarily exist physically.

Further, on the playback side in FIG. 1B, it is assumed that the recording/playback unit 107 uses the same circuit block as that on the recording side in FIG. 1A and therefore the same reference characters are used. Further, a demultiplexer 109 demultiplexes a multiplexed stream, which has been reproduced from the recording medium D by the recording/playback unit 107, into a video stream and audio stream. The demultiplexed video stream is supplied to a video decoder 110 and the demultiplexed audio stream is supplied to an audio decoder 111.

The video decoder 110 decodes the video stream reproduced from the recording medium D. A video output unit 113 outputs the video stream, which has been decoded by the video decoder 110, to an external monitor or the like as video data. The audio decoder 111 decodes the audio stream reproduced from the recording medium D. An audio output unit 112 outputs the audio stream, which has been decoded by the audio decoder 111, to a speaker, etc., of the external monitor as audio data.

More specifically, as illustrated in FIG. 2A, it is assumed that the video encoder 103 on the recording side is composed of an encoding circuit 201 and VBV buffer 202. Further, as illustrated in FIG. 2B, it is assumed that the video decoder 110 is composed of a decoding circuit 203 and VBV buffer 202. Since it is assumed that the recording and playback sides have been integrated, it is assumed that the VBV buffer 202 is shared and therefore is represented by the same reference characters. However, the VBV buffer 202 is strictly virtual. In actuality, therefore, the buffer memory illustrated as being connected does not necessarily exist.

If the VBV buffer 202 on the recording side is viewed from the side of the encoding circuit 201, the VBV buffer 202 is connected to the output side of the encoding circuit 201, as illustrated in FIG. 2A. In this case, the transfer of stream data from the encoding circuit 201 to the VBV buffer 202 is theoretically executed instantaneously. The transfer of stream data from the VBV buffer 202 to the multiplexer 106 is executed at a transfer rate "Rmax" in a case where the stream data exists in the VBV buffer 202. However, if the stream data does not exist in the VBV buffer 202, then it is assumed that the transfer rate is "0".

In this case the fullness of the VBV buffer 202 is ascertained and the operation of the video encoder 103 is controlled by the fullness controller 105 in such a manner that buffer fullness will not exceed the maximum buffer capacity of the VBV buffer 202 (i.e., in such a manner that overflow will not occur).

On the other hand, if the VBV buffer 202 on the playback side is viewed from the side of the decoding circuit 203, the VBV buffer 202 is connected to the input side of the decoding circuit 203, as illustrated in FIG. 2B. In this case, the transfer of stream data from the VBV buffer 202 to the decoding circuit 203 is theoretically executed instantaneously. The transfer of stream data from the demultiplexer 109, which demultiplexes the multiplexed stream read out of the recording/playback unit 107, to the VBV buffer 202 is executed at the transfer rate "Rmax" or transfer rate "0".

In this case the stream data must be transferred in such a manner that the maximum buffer capacity of the VBV buffer 202 is not exceeded, and the stream data must be transferred to the decoding circuit 203 so as to be in time for decoding in the decoding circuit 203. If the transfer of this stream data is not in time for decoding in the decoding circuit 203, underflow will occur in the VBV buffer 202 and signal dropout will occur.

Figure 3:
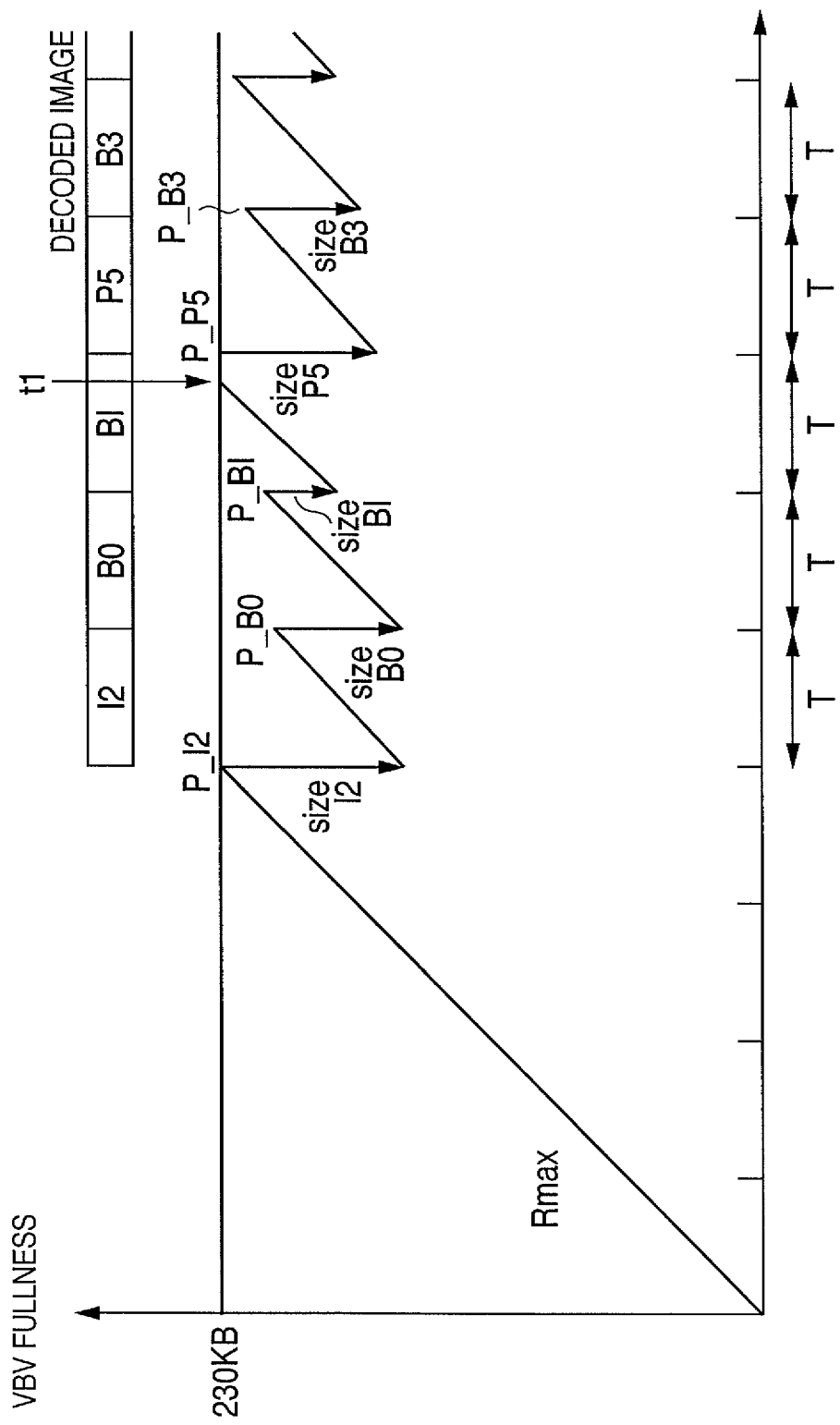
FIG. 3 is a conceptual view illustrating the transition of amount of a VBV buffer occupied in MPEG-2.

FIG. 3 is a diagram illustrating the transition of fullness of VBV buffer 202 as seen from the side of the decoding circuit 203 on the playback side. A method of updating fullness of the decoding circuit 203 will be described with reference to FIG. 3, in which the vertical axis represents the fullness of the VBV buffer 202 and the horizontal axis indicates time. Buffer fullness represented along the vertical axis is indicated as an increasing value. This means that the higher the value along the vertical axis, the greater the fullness of the VBV buffer 202. Further, the overall buffer capacity of the VBV buffer 202 is assumed to be 230 KB, by way of example.

At playback, the video stream contained in the multiplexed stream is transferred to the VBV buffer 202 through the recording/playback unit 107 and demultiplexer 109 at the transfer rate "Rmax". When the timing for decoding a picture "I2" arrives in FIG. 3, a video stream of code amount "size I2" is transferred from the VBV buffer 202 to the decoding circuit 203 from a position P-I2 of buffer fullness instantaneously at this timing. Then, in similar fashion, a video stream is transferred to the VBV buffer 202 through the recording/playback unit 107 and demultiplexer 109 at the transfer rate "Rmax" up to the timing for decoding a picture "B0". In FIG. 3, time T represents a picture display period and is the reciprocal of the frame rate.

Further, in a case where a video stream overflows from the VBV buffer 202, at timing t1 in FIG. 3, the transfer of the video stream from the demultiplexer 109 is stopped. Thus, the fullness of VBV buffer 202 as seen from the side of the decoding circuit 203 is controlled at the time of playback.

At the time of recording, on the other hand, the fullness controller 105 controls the fullness of the VBV buffer 202, exercises control in such a manner that the VBV buffer 202 will not underflow and controls the encoding circuit 201 so as to encode an uninterrupted video stream.

FIG. 4 is a diagram illustrating an example of the transition of fullness of VBV buffer 202 as seen from the side of the decoding circuit 203 in a case where a multiplexed stream of two chapters is played back continuously. The vertical axis represents the fullness of the VBV buffer 202 and the horizontal axis indicates time. The fullness of the buffer represented along the vertical axis is indicated as an increasing value. This means that the higher the value along the vertical axis, the greater the fullness of the VBV buffer 202.

In a case where a video stream exists in the multiplexed stream, transfer and storage of the video stream to the VBV buffer 202 are carried out at the transfer rate "Rmax". If a video stream does not exist in the base station, however, no transfer and storage of a video stream takes place. Further, transfer of a video stream from the VBV buffer 202 to the decoding circuit 203 is performed instantaneously at the timing at which the decoding of each picture starts.

It should be noted that although the VBV buffer 202 has enough buffer capacity to store several frames of a video stream, an audio buffer (not shown) for storing the audio stream has a small buffer capacity. After all video streams are multiplexed, therefore, padding data for adjusting the stream size in accordance with the audio stream or units of an error-correction code (ECC) is multiplexed, as shown in FIG. 4.

In the case of FIG. 4, the decoded image at the time of playback develops a break between a chapter played back previously and a chapter played back subsequently. In this case, the video stream of the succeeding chapter is read out of the recording medium (disk) D and transferred to the VBV buffer 202 after the amount of the VBV buffer 202 occupied by the video stream of the preceding chapter becomes zero. As a result, it is no longer necessary to take into account the fullness of the VBV buffer 202 when playback of the succeeding chapter starts.

Figure 5:
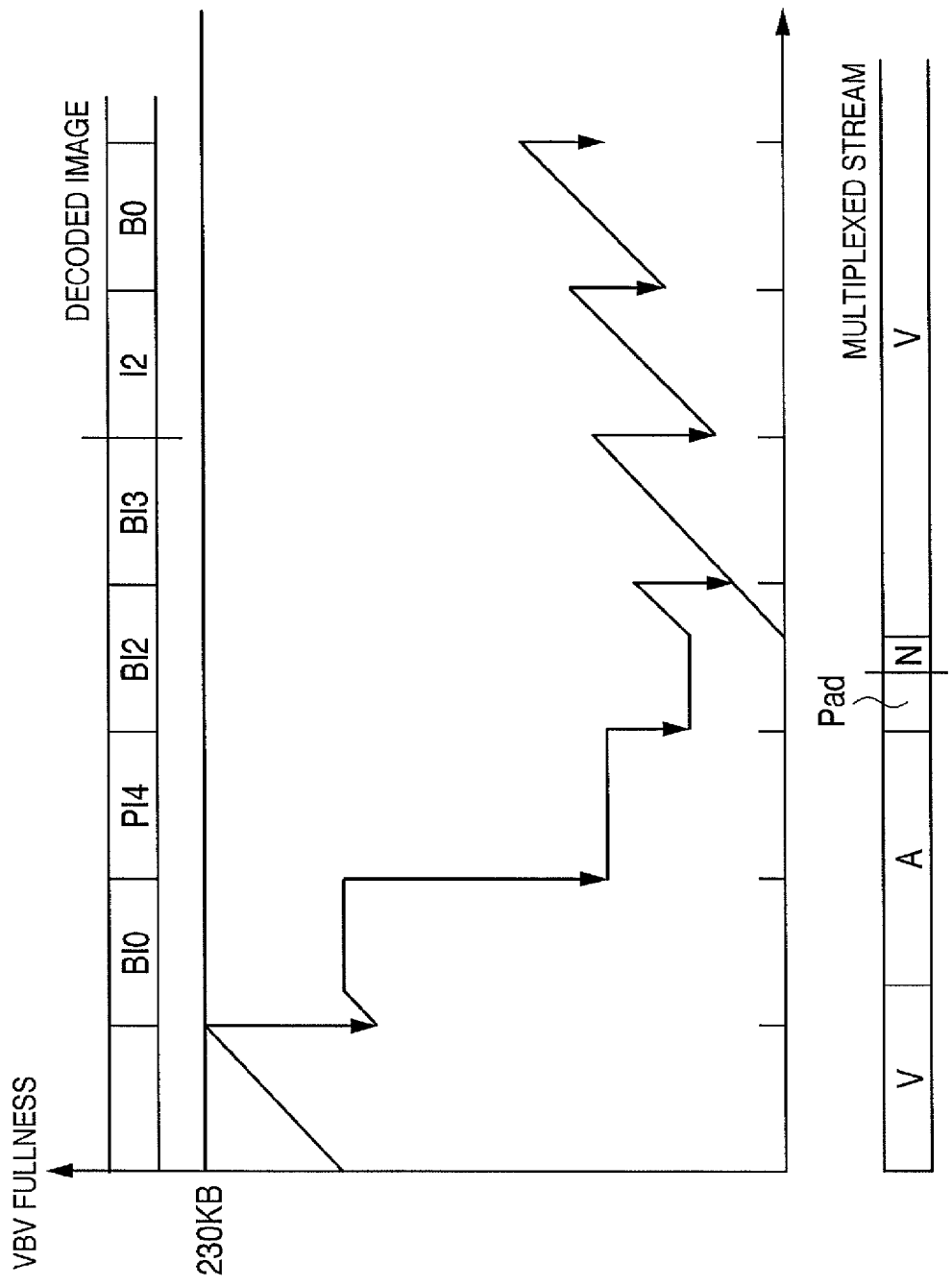
FIG. 5 is a conceptual view illustrating the transition of VBV buffer fullness at the time of connection without loss of data in MPEG-2.
Figure 6:
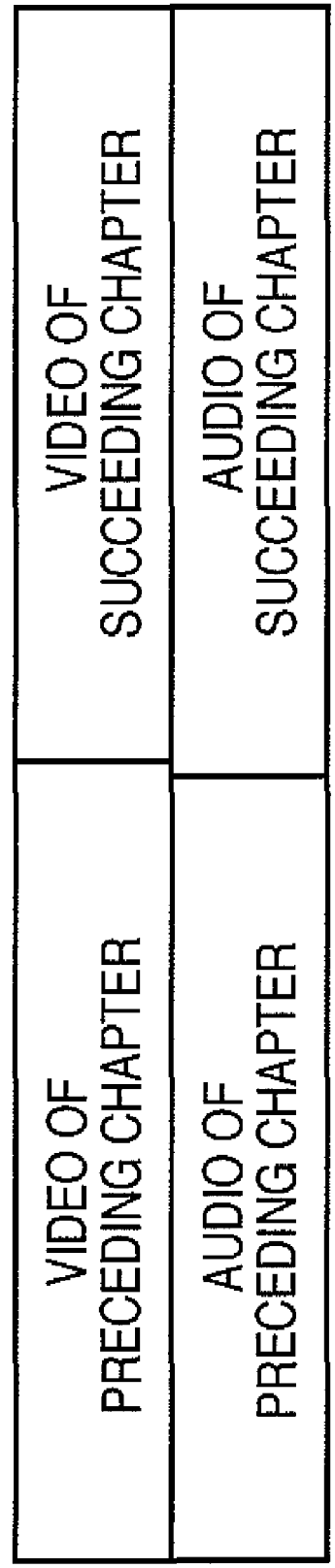
FIG. 6 is a conceptual view illustrating the relationship between audio and video of preceding and succeeding chapters at the time of connection without loss of data in MPEG-2.

FIG. 5 illustrates a case where video streams of preceding and succeeding chapters have been played back in such a manner that there is no loss of video data at the portion where the changeover occurs. In this case it is necessary to prevent loss of audio as well in a manner similar to that of video, as illustrated in FIG. 6. However, since the duration of a frame in a video stream differs from that in an audio stream, there are occasions where the lengths of video and audio of a preceding chapter in the portion immediately preceding changeover are different.

In order to perform playback in such a manner that there will be no loss at the portion where there is a changeover between different chapters, as illustrated in FIG. 5, it is necessary to start transferring the video stream of the succeeding chapter to the VBV buffer 202 before the amount occupied by the video stream of the preceding chapter in the VBV buffer 202 becomes zero. Therefore, when the amount of code to be allocated to the chapter at the beginning portion of the video stream of the succeeding chapter is decided, it is necessary to take into consideration the amount of the buffer occupied by the video stream of the preceding chapter that has accumulated in the VBV buffer 202 at the start of playback of the video stream of the succeeding chapter.

If it is attempted to transfer a video stream from the VBV buffer 202 to the decoding circuit at the time of playback at a stage where a sufficient amount of the video stream has not accumulated in the VBV buffer 202, there is the danger that underflow will occur in the VBV buffer 202. In FIG. 5, for example, imagine a case where a video stream necessary in order to decode the leading picture "I2" in a succeeding chapter is transferred instantaneously. In this case, if a sufficient amount of data of the video stream has not accumulated in the VBV buffer 202, then the data necessary for decoding will not be obtained and, as a result, playback without loss will not be possible.

Accordingly, in order to accumulate a sufficient amount of data of the video stream in the VBV buffer 202 in advance, it is necessary to start, at a timing as early as possible, the transfer and storage of data of the video stream of the succeeding chapter to the VBV buffer. However, there is a limitation upon this timing because read-out of the video stream of the succeeding chapter must be started after the end of read-out of the video stream of the preceding chapter from the disk D.

Accordingly, in the recording apparatus according to this embodiment of the present invention, the timing of start of read-out of the data of a succeeding video stream from the disk is adjusted to occur earlier by adjusting the timing of end of multiplexing of an audio stream of the preceding chapter at the time of recording. As a result, it is so arranged that a sufficient amount of stream data accumulates in the VBV buffer 202 at the time of decoding of the preceding chapter in the data of the succeeding video stream.

To accomplish this, the multiplexing controller 108 controls the condition for ending the generation of the multiplexed stream of the preceding chapter in the multiplexer 106. As mentioned earlier, the audio buffer that stores the audio stream has a small buffer capacity. Accordingly, for the convenience of generating the multiplexed stream, additional data for making chapter size conform to the audio stream or unit of ECC is multiplexed following the multiplexing of all video streams.

In a case where a multiplexed stream of two chapters is played back continuously, the multiplexing controller 108 controls the multiplexer 106 in such a manner that the fullness of the VBV buffer at the time of decoding of the leading picture "I2" of the succeeding chapter exceeds a set threshold value "VBV_th". That is, in the recording apparatus according to the first embodiment, the threshold value "VBV_th" is set depending upon the amount of code to be allocated to the leading picture "I2" of the succeeding chapter. In other words, in a case where it is desired that the leading picture of the succeeding chapter be encoded to a high image quality, the threshold value "VBV_th" should be set higher. The higher the threshold value is set, the greater the amount of code that can be allocated to the leading picture.

Figure 7:
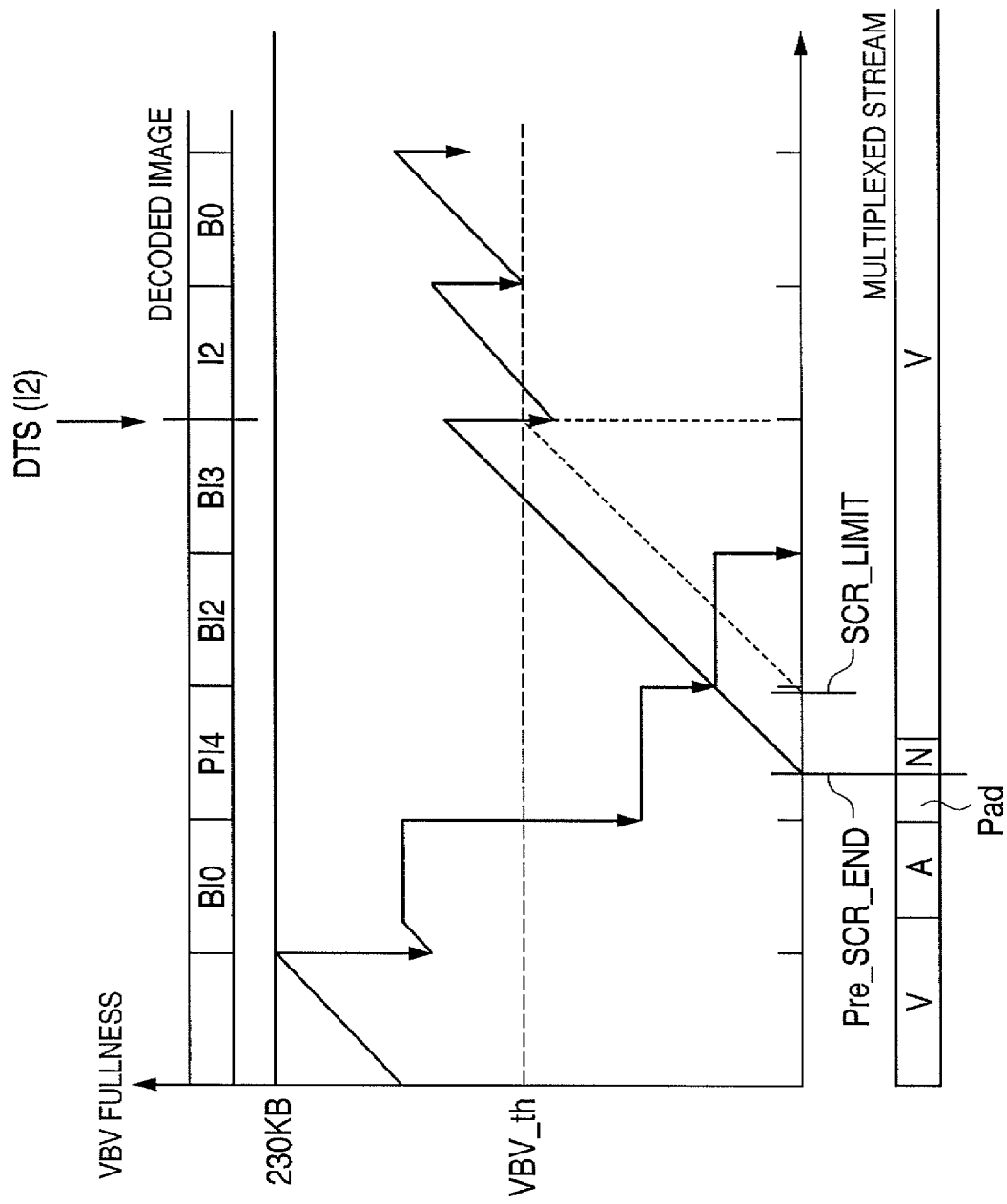
FIG. 7 is a conceptual view illustrating an example of transition of VBV buffer fullness at the time of connection without loss of data, this diagram being useful in describing the operation of the recording apparatus according to this embodiment of the present invention.

FIG. 7 is a conceptual view illustrating how data accumulates in the buffer memory in a case where a multiplexed stream of two chapters is played back continuously. Reference will be had to FIG. 7 to describe a condition for which the amount of the VBV buffer 202 occupied at the start of decoding of the leading picture "I2" in the succeeding chapter will exceed the set threshold value "VBV_th".

In the recording apparatus according to this embodiment, an encoded video stream and encoded audio stream are divided into a plurality of packets every predetermined amount of data, and multiplexing is performed on a per-packet basis.

Let "pre_SCR_END" represent the timing at which the final data of a preceding chapter is transferred to the VBV buffer, and let "DTS(I2)" represent the timing of decoding of the leading picture "I2" in the succeeding chapter. Furthermore, let "SCR_LIMIT" represent the timing at which the transfer of the video stream of the succeeding chapter to the VBV buffer 202 must be started in such a manner that the amount of the buffer occupied by the multiplexed stream that has accumulated in the VBV buffer at the decoding timing "DTS(I2)" will exceed the set threshold value "VBV_th". In this case, the transfer-start timing "SCR_LIMIT" is represented by the following equation:

$$\text{"SCR\_LIMIT"}=\text{"DTS(I2)"}-\text{"VBV\_th"}/\text{"rmax"}$$

Since the threshold value "VBV_th" is exceeded, it is required that the transfer timing "pre_SCR_END" of the final data in the preceding chapter be earlier than transfer-start timing "SCR_LIMIT". To accomplish this, it is required that generation of the multiplexed stream of the preceding chapter be concluded in such a manner that "pre_SCR_END" will not exceed "SCR_LIMIT". If this is expressed by an equation, it will be required that the following relationship hold:

$$\text{"pre\_SCR\_END"}<\text{"SCR\_LIMIT"}$$

Figure 8:
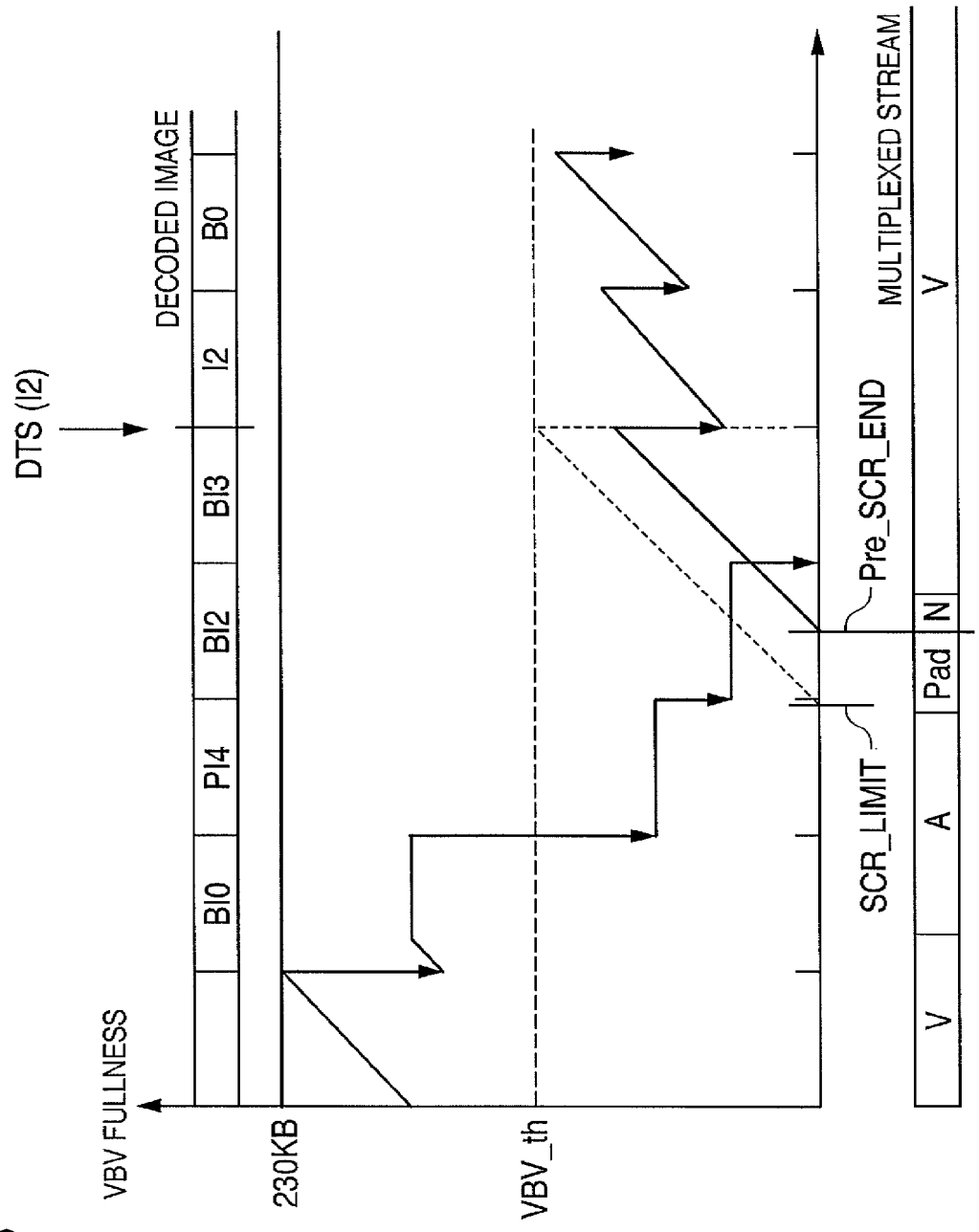
FIG. 8 is a conceptual view illustrating an example of transition of VBV buffer fullness at the time of connection without loss of data, this diagram being useful in describing the operation of the recording apparatus according to this embodiment of the present invention.

Imagine a case where generation of the multiplexed stream of the preceding chapter cannot be concluded in such a manner that the transfer-arrival timing "pre_SCR_END" of the final data of the preceding chapter will not exceed the transfer-start timing "SCR_LIMIT" of the succeeding chapter. In this case, the fullness of the VBV buffer 202 will not exceed the threshold value "VBV_th" at the decoding timing "DTS (I2)", as illustrated in FIG. 8.

Accordingly, in the recording apparatus according to this embodiment of the present invention, when halting of recording of the preceding chapter has been specified, the multiplexing controller 108 adjusts the multiplexed amount of the audio stream after all video streams have been multiplexed. At the moment of decoding timing "DRS(I2)", the multiplexer 106 is controlled in such a manner that the amount of the VBV buffer 202 occupied will exceed the set threshold value "VBV_th".

Figure 9:
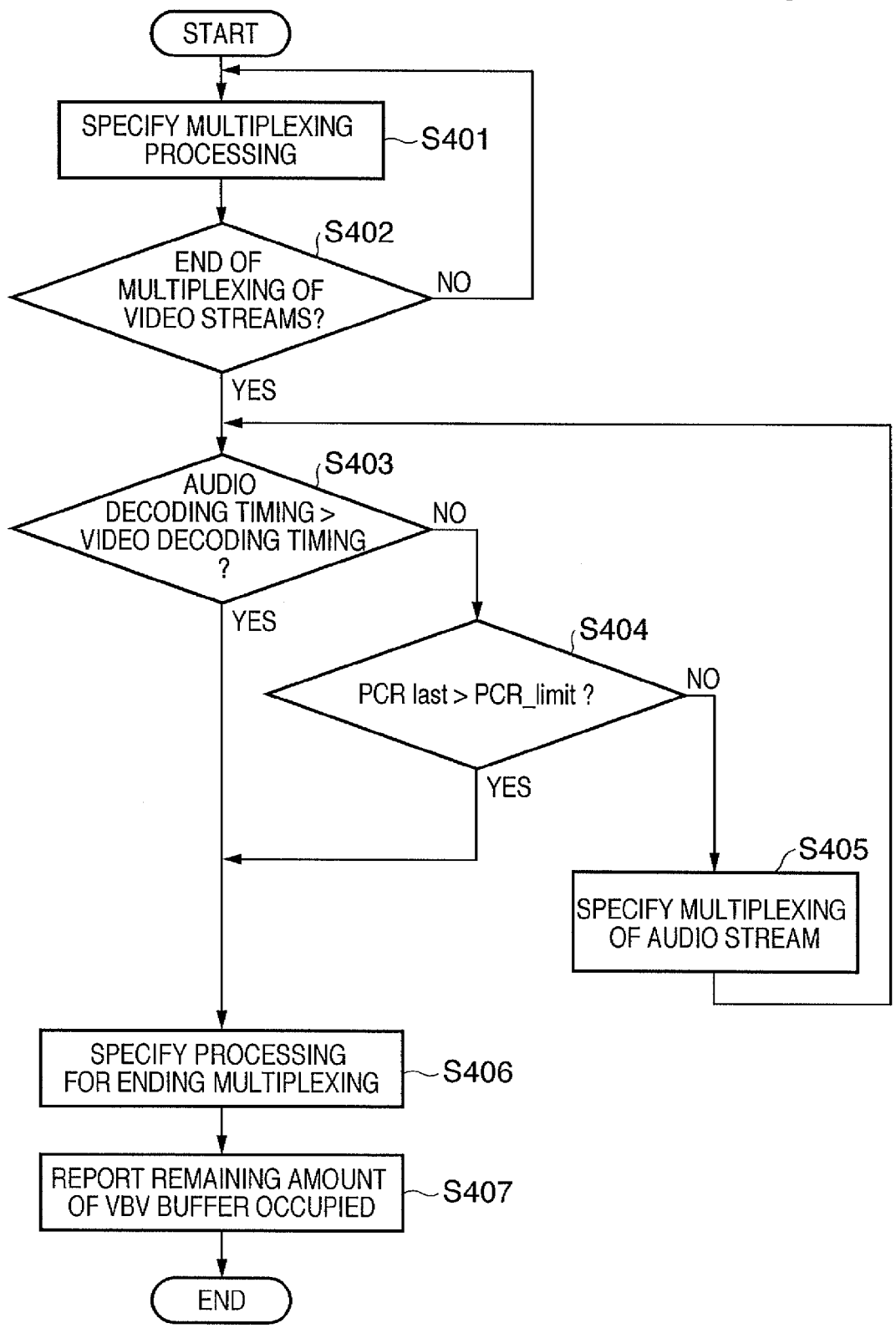
FIG. 9 is a flowchart of multiplexing control processing at the time of connection without loss of data, this flowchart being useful in describing the operation of the recording apparatus according to this embodiment of the present invention.

FIG. 9 is a flowchart illustrating control of the multiplexer 106 by the multiplexing controller 108 when recording of a multiplexed stream is halted. Reference will be had to FIG. 9 to describe a control method whereby the multiplexing controller 108 exercises control in such a manner that the amount of the VBV buffer 202 occupied at decoding of the leading picture "I2" in the succeeding chapter will exceed the set threshold value "VBV_th".

If a command to halt recording is issued from a operation input unit (not shown), the processing in the flowchart of FIG. 9 starts. First, at step S401, a frame in which recording conforming to the recording-halt command is halted is decided and the multiplexing controller 108 instructs the multiplexer 106 to execute ordinary multiplexing processing. At step S402, the multiplexing controller 108 determines whether all video streams of preceding chapters inclusive of the recording-halt frame have been made a multiplexed stream. Control proceeds to step S403 if all of these streams have been made a multiplexed stream. However, if there is a video stream that has not been made a multiplexed stream, control returns to step S401 and the multiplexer 106 is instructed to execute the usual processing of a multiplexed stream.

At step S403, the multiplexing controller 108 compares the decoding timing (time) of an audio stream that is to be made a multiplexed stream from this point onward and the decoding timing (time) of a video stream that has already been made a multiplexed stream. If the decoding timing (time) of the audio stream is greater than the decoding timing (time) of the video stream that has already been made a multiplexed stream, then control proceeds to step S406.

However, if the decoding timing (time) of the audio stream is equal to or less than the decoding timing (time) of the video stream that has already been made a multiplexed stream, then control branches to step S404.

In this embodiment, when a video stream and an audio stream are multiplexed, multiplexing is performed in packet units, where the packet is defined according to the MPEG scheme. Specifically, the video and audio streams are each divided into packets comprising a prescribed amount of data, and the video data (video packet) and audio data (audio packet) are multiplexed in units of these packets.

At step S404, assume a case where one further packet of an audio stream has been multiplexed onto a video stream. The multiplexing controller 108 determines whether a timing "PCRlast" at which the final packet of the preceding chapter is transferred to the VBV buffer is greater than a transfer timing "PCR_limit" prevailing in a case where the fullness of the VBV buffer 202 exceeds the set threshold value at the decoding timing of the succeeding leading picture "I2".

In this case, assume that the arrival timing of the final packet of the preceding chapter is smaller than transfer-start timing prevailing in a case where the amount of the buffer occupied by video data that has accumulated in the VBV buffer 202 exceeds the set threshold value at the decoding timing of the leading picture "I2" in the succeeding chapter. In this case, control branches to step S405. Otherwise, control proceeds to step S406.

At step S405, "PCRlast" does not exceed the transfer-start timing "SCR_LIMIT" even if one further packet of the audio stream is multiplexed onto the multiplexed stream. In this case, therefore, the multiplexing controller 108 multiplexes just one packet of the audio stream onto the already multiplexed stream and returns control to step S403. The multiplexing controller 108 executes the processing of step S403 again.

The multiplexing controller 108 specifies processing for ending multiplexing at step S406. In a case where the audio stream has not been multiplexed in frame units, the processing for ending multiplexing makes the remaining frames a multiplexed stream in such a manner that an audio stream that has been made a multiplexed stream becomes the frame unit. In a case where the size of the stream of a preceding chapter is not the ECC unit, a packet of additional data is made the multiplexed stream, processing is executed in such a manner that the size of the preceding multiplexed stream becomes the ECC unit, and multiplexing processing is concluded. Next, at step S407, the fullness of the VBV buffer 202 at the time of decoding of the leading picture "I2" in the succeeding chapter is computed, the result is reported to the fullness controller 105 and processing is terminated. The above-described operation is executed by controlling the multiplexer 106 using the multiplexing controller 108.

By executing the processing set forth above, it is possible record a different chapter of a video stream successively without degrading the image quality of a succeeding chapter at the time of playback even if recording is resumed the next time.

It should be noted that with regard to the processing shown in FIG. 9, the roles of the multiplexing controller 108 and fullness controller 105 can be performed by a CPU (not shown), and the above-described control can be implemented in accordance with a program that has been stored in a ROM, etc., connected to the CPU.

FIG. 10 is a conceptual view illustrating the relationship between audio and video of preceding and succeeding chapters in the recording apparatus according to this embodiment of the present invention. Reference will be had to FIG. 10 to describe the relationship between audio and video of preceding and succeeding chapters multiplexed under the control of the multiplexing controller 108.

There are instances where the multiplexing controller 108 multiplexes less of the audio stream of a preceding chapter onto a video stream in such a manner that the amount of the buffer occupied by the video stream accumulated in the VBV buffer will exceed the set threshold value "VBV_th" at the decoding timing of the leading picture "I2" in the succeeding chapter. In this case, the succeeding chapters are multiplexed from a timing that is earlier for the audio stream than for the video stream, and the video and audio are connected without dropout.

By thus performing operation, if a user has recorded a plurality of chapters, a state will be attained in which the amount of the VBV buffer 202 occupied exceeds the set threshold value "VBV_th" at the decoding timing of the leading picture "I2" in the succeeding chapter. Accordingly, a sufficient amount of stream code can be allocated to the succeeding chapter in comparison with the conventional arrangement in which there is the possibility that the amount of the VBV buffer 202 occupied will be too small. Further, although the timing of changeover between video and audio at the location of the connection between a preceding chapter and succeeding chapter shifts, the user will not be annoyed significantly because the video and audio do not change over simultaneously from the outset.

In accordance with the present invention, a succeeding chapter can be recorded so as to be reproducible at a stable image quality without a decline in the image quality of the succeeding chapter at the time of playback.

<Other Embodiments>

In the recording apparatus according to the embodiment described above, control is carried out by the multiplexing controller 108 in such a manner that the amount of the VBV buffer 202 occupied will accumulate up to the set threshold value "VBV_th" at the decoding timing of the leading picture in the succeeding chapter. However, an arrangement in which control is exercised by the multiplexing controller 108 in such a manner that the amount of the VBV buffer 202 occupied will accumulate to the full buffer capacity of the VBV buffer 202 also falls within the scope of the present invention.

Furthermore, it is possible for the recording apparatus according to the embodiment of the present invention to be constructed as a digital video camera. Further, the recording medium D used in recording may be magnetic tape or a solid-state memory device such as a semiconductor memory as a matter of course.

Further, it is possible for the recording apparatus according to the embodiment of the present invention to be constructed as a recording/playback apparatus. Furthermore, it is possible for the recording apparatus according to the embodiment of the present invention to be applied as an editing apparatus having a simple editing function.

The present invention may be applied to a system constituted by a plurality of devices (e.g., a host computer, camera, interface, liquid crystal panel, etc.) or to an apparatus comprising a single device (e.g., a copier or facsimile machine, etc.).

Further, the present invention can be implemented by supplying a system or apparatus with a storage medium storing the program codes of the software for performing the function of the foregoing embodiment. That is, the object of the present invention is also attained by reading out and executing program codes, which have been stored on a storage medium, by a computer (CPU or MPU) of the system or apparatus. In this case, the program codes per se read from the storage medium implement the functions of the embodiment, and the storage medium storing the program codes constitutes the invention. Examples of storage media that can be used for supplying the program code are a flexible disk, hard disk, optical disk, magneto-optical disk, CD-ROM, CD-R, magnetic tape, non-volatile type memory card or ROM, etc.

Further, besides the case where the aforesaid functions according to the embodiment are implemented by executing the program codes read by a computer, an operating system or the like running on the computer can execute some or all of the actual processing based upon the commands of the program codes. Thus the present invention also covers a case where the functions of the foregoing embodiment are implemented by this processing.

Furthermore, program code that has been read from a storage medium can be executed upon being written to a memory provided on a function expansion board inserted into a computer or provided in a function expansion unit connected to the computer. Accordingly, a CPU or the like provided on the function expansion board or function expansion unit performs some or all of the actual processing based upon the commands of the program code and the functions of the foregoing embodiment are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-009585, filed on Jan. 18, 2007, which is hereby incorporated by reference herein in its entirety.

The invention claimed is:

1. A recording apparatus comprising:
   a video encoder that encodes video data and generates a video stream;
   an audio encoder that encodes audio data and generates an audio stream;
   a multiplexer that multiplexes the video stream and the audio stream and generates a multiplexed stream;
   a recording unit that records the multiplexed stream on a recording medium, the recording unit recording a first multiplexed stream on the recording medium in accordance with an instruction from a user to start recording the first multiplexed stream, and recording a second multiplexed stream on the recording medium in accordance with an instruction from a user to start recording the second multiplexed stream, the second multiplexed stream being played back following the first multiplexed stream;
   a fullness controller that controls said video encoder based upon a fullness of a virtual buffer memory with the multiplexed stream, the virtual memory being used when the multiplexed stream is decoded; and
   a multiplexing controller that controls said multiplexer in accordance with an instruction from the user to stop recording the first multiplexed stream to stop multiplexing the audio stream onto the first multiplexed stream, wherein said multiplexing controller sets a threshold value based upon an amount of code allocated for a lead-off picture of the video stream contained in the second multiplexed stream, and controls a timing at which the multiplexing of the audio stream by said multiplexer onto the first multiplexed stream ends in such a manner that the fullness of the virtual buffer memory at the time of decoding of the lead-off picture of the video stream contained in the second multiplexed stream will exceed the set threshold value.

2. The apparatus according to claim 1, wherein said multiplexing controller controls said multiplexer in such a manner that starting of playback of the second multiplexed stream occurs earlier than timing for start of playback necessary in order that the fullness of the virtual buffer memory at the time of decoding of a lead-off picture of the video stream contained in the second multiplexed stream will exceed the set threshold value.

3. The apparatus according to claim 1, wherein said multiplexing controller sets the threshold value based upon the amount of code allocated for the lead-off picture, decoding timing of the lead-off picture of the video stream contained in the second multiplexed stream, and speed of playback at the time of playback of the multiplexed stream.

4. A recording method comprising:
   a video encoding step of encoding video data and generating a video stream;
   an audio encoding step of encoding audio data and generating an audio stream;
   a multiplexing step of multiplexing the video stream and audio stream and generating a multiplexed stream;
   a recording step of recording the multiplexed stream on a recording medium, the recording step recording a first multiplexed stream on the recording medium in accordance with an instruction from a user to start recording the first multiplexed stream, and recording a second multiplexed stream on the recording medium in accordance with an instruction from a user to start recording the second multiplexed stream, the second multiplexed stream being played back following the first multiplexed stream;
   a fullness control step of controlling the video encoder based upon a fullness of a virtual buffer memory with the multiplexed stream, the virtual memory being used when the multiplexed stream is decoded; and
   a multiplexing control step of controlling the multiplexing step in accordance with an instruction from the user to stop recording the first multiplexed stream to stop multiplexing the audio stream onto the first multiplexed stream,
   wherein the multiplexing control step sets a threshold value based upon an amount of code allocated for a lead-off picture of the video stream contained in the second multiplexed stream, and controls a timing at which the multiplexing of the audio stream by the multiplexing step onto the first multiplexed stream ends in such a manner that the fullness of the virtual buffer memory at the time of decoding of the lead-off picture of the video stream contained in the second multiplexed stream will exceed the set threshold value.

* * * * *